Dec. 11, 1934.  H. THOMAS  1,983,582
SAW GUARD
Filed July 28, 1933
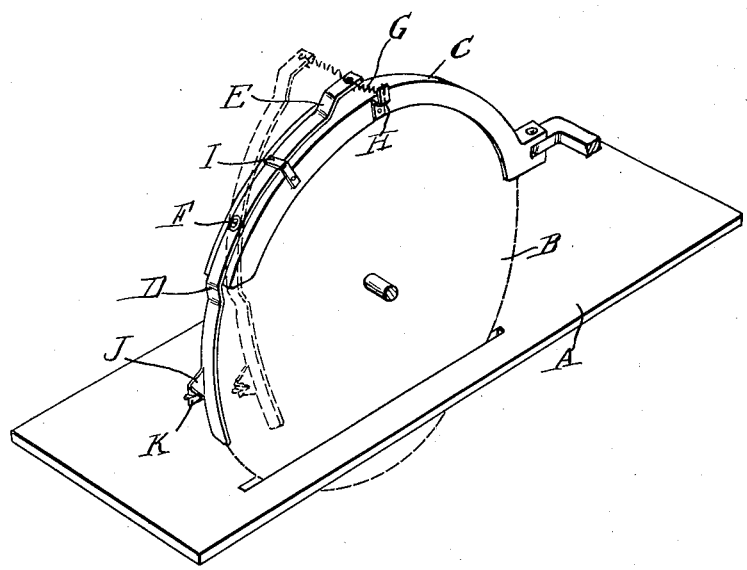
Inventor
Harry Thomas
By Raymond A. Robie
Attorney Patented Dec. 11, 1934

1,983,582

UNITED STATES PATENT OFFICE 1,983,582

SAW GUARD

Harry Thomas, Victoria, British Columbia, Canada

Application July 28, 1933, Serial No. 682,608

4 Claims. (Cl. 143—159)

The present invention relates to improvements in saw guards and has particular reference to a saw guard for circular saws.

An important object of the invention is the provision of a movable guard member adapted to normally cover the work engaging portion of a saw to form a protective covering therefor.

A further object of the invention is the provision of a saw guard of the above character which may be swung to an uncovering position when work is being fed to the saw.

Another object of the invention is the provision of a saw guard of the above type constructed so that the movable guard member may be swung to an uncovering position by the work fed to the saw.

Still another object of the invention is the provision of a saw guard of the above character having means for automatically restoring the guard member to a saw covering position when released.

A still further object of the invention is the provision of a saw guard of the above type which will be relatively simple in construction and efficient and reliable in use.

Other objects and advantages of the invention will become apparent as the description progresses.

In the accompanying drawing forming a part of this specification and in which like reference characters are employed to designate corresponding parts throughout the same:

The figure is a perspective view showing the improved saw guard operatively associated with a saw.

Referring to the drawing, wherein for the purpose of illustration is shown a preferred embodiment of the invention, the letter A generally designates a saw table, as for instance the table of a shingle machine.

Projecting through a slot in the table A and disposed in a vertical position is a circular saw B mounted for rotary operation.

The top and rear portion of the saw B is covered by a fixed channel-shaped guard C curved in approximate conformity with the circular curvature of the saw. In sawing machines of this type, the usual fixed guard member C is arranged so as to leave the front work engaging portion of the saw uncovered in order that the work may be fed to a saw.

The important feature of the present invention resides in the provision of an adjustable or movable guard member adapted to form a protective covering over the periphery of the work engaging portion of the saw at all times when no work is actually fed to the saw and which may be swung laterally to uncover the work engaging part of the saw when shingle blocks or other work is being fed to the saw.

An arcuate bar of segmental form, generally indicated by the letter D, and curved in approximate conformity with the circular curvature of the saw, is disposed on the forward portion of the fixed guard C, the lower portion of the guard member D being formed so that, in its normal covering position, it will cover the front work engaging part of the saw. The upper end portion of the guard member D is radially offset as shown at E and is provided with an aperture adjacent the extremity.

A pivot pin F, secured on the forward portion of the fixed guard C, extends through the intermediate portion of the guard member D so that the latter may be swung thereabout. A tension spring G, having one end connected to the apertured upper extremity of the saw guard and the opposed end connected with the bracket H attached to the side of the guard C, is disposed to swing the movable guard member D in one direction, that is, to a saw covering position. Movement of the guard member D under the influence of the tension spring G is limited by an angular stop bracket I attached to the guard C disposed to intersect the upper section of the guard member.

Upon the lower portion of the guard member D is formed a radial outwardly projecting lug J formed at the outer end with a hook K.

It is customary, during the sawing operation, as for instance when sawing shingles, to adjust the shingle block laterally to a selected position in front of the cutting part of the saw and thereafter feed the block longitudinally into the saw. Consequently, when the block is shifted laterally to obtain its proper cutting position, it will engage the lug J and swing the movable guard member about the pivot F, shifting the lower part of the guard member from its normal saw covering position to a laterally offset position and enabling the block to be fed into the saw. When the sawing operation is completed and the movable guard member D released, it will be automatically restored to its covering position by the action of the spring G which will swing the guard member about the pivot until the upper part engages the stop I and at which time the bottom portion of the guard member will assume a position covering the front work engaging portion of the saw.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:—

1. A saw guard comprising an arcuate guard member adapted to cover the work engaging part of a circular saw, means connecting the middle portion of the guard member with a support in such manner as to enable swinging of the guard in a plane transverse to that of the saw from a saw covering to an uncovering position, and means for automatically restoring the guard member to a saw covering position when it is released.

2. A saw guard comprising a guard member adapted to cover the work engaging part of a saw, means pivotally connecting the middle portion of the guard member with a support transversely to the plane of the saw, and means for automatically restoring the guard member from an uncovering to a saw covering position.

3. A saw guard comprising a guard member adapted to cover the work engaging part of a saw, means pivotally connecting the guard member with a support, and means for automatically restoring the guard member from an uncovering to a saw covering position, the said guard member being mounted so that it may be swung around its center to an uncovering position, said swinging of the guard taking place in a plane transverse to that of the saw.

4. A saw guard comprising an arcuate guard member, means pivotally connecting the middle portion of the guard member with a support in such manner that a portion of the guard member is adapted to cover the work engaging portion of a circular saw, spring means connected with the guard member for automatically swinging the latter from an uncovering to a covering position, a stop for limiting the swinging movement of the guard member, and a projection on the guard member adapted to engage a work piece whereby the latter may be employed to swing the guard member from a saw covering to an uncovering position in a plane transverse to that of the saw.

HARRY THOMAS.